United States Patent Office 2,804,771
Patented Sept. 3, 1957

2,804,771

FLOW METERS

Hugh M. Brown, Clemson, S. C., assignor to The Clemson Agricultural College of South Carolina, Clemson, S. C., a corporation of South Carolina Application November 24, 1953, Serial No. 393,982

5 Claims. (Cl. 73—228)

This invention relates to devices for indicating the rate of flow of fluids and especially liquids.

An object of the invention is to devise a flow meter which is constructed of relatively few parts and is simple in operation.

The meters of my invention involve arrangements for changing the direction of flow of the fluid and for measuring the reaction force necessary to change the direction of flow. An inlet conduit section and an outlet conduit section arranged at an angle to the inlet section are connected by an intermediate conduit section at least a portion of which is mounted to move under the influence of the force of reaction exerted by the fluid in changing its direction of flow. Suitable indicator means is connected with the movable portion of the intermediate section for producing an indication in accordance with the magnitude of the reaction force.

Figure 1:
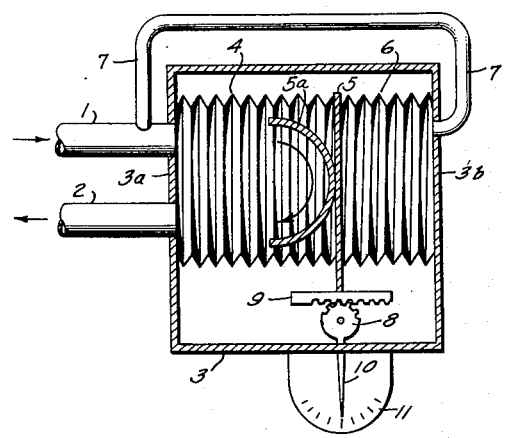
Figure 2:
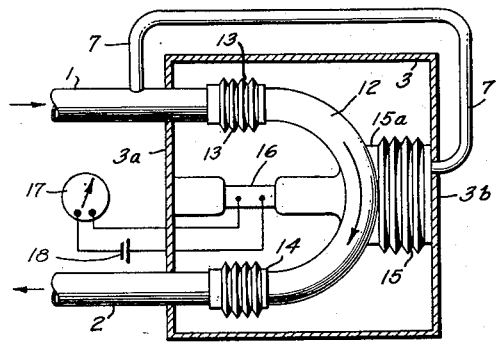

Two different forms of my invention are illustrated in the accompanying drawing in which Figure 1 is a view shown partly in section and partly in elevation, illustrating one form of intermediate conduit section and one form of indicator device; and Figure 2 is a second view shown partly in section and partly in elevation indicating a modification of the intermediate conduit section and a different form of indicator device.

Referring to the drawing, the flow meter has an inlet conduit section 1 and an outlet conduit section 2, both sections having fluid-tight connections around apertures formed in one wall 3a of a casing or frame 3. The inlet and outlet conduit sections are connected by an intermediate conduit section having a curved movable wall portion which receives the fluid from section 1, reverses its direction of flow and delivers the fluid to outlet section 2. In the arrangement illustrated in Figure 1, the intermediate conduit section is formed of a tubular bellows 4 having one end thereof connected to plate 3a in a fluid-tight joint surrounding the ends of conduit sections 1 and 2, and the other end of bellows 4 being closed by rigid wall 5 which is free to move as the bellows expands or contracts. The direction of flow of fluid is reversed by means of a curved wall portion 5a carried by the movable end wall 5 of the bellows 4 and arranged to guide the fluid from inlet section 1 along a smoothly curved path to outlet section 2.

For the purpose of counterbalancing the static fluid pressure on the end wall 5 of bellows 4, a fluid-pressure motor including a second tubular bellows 6 arranged on the opposite side of the movable wall 5 with respect to the bellows 4 and in axial alignment with the bellows 4. One end of bellows 6 is connected in fluid-tight relation with the plate 5, and the opposite end is sealed by the wall 3b of the casing or frame 3. Static fluid pressure is communicated to the space within bellows 6 by means of a branch pipe connection 7 extending from inlet conduit section 1 to an opening in wall 3b within the end of bellows 6. When both bellows sections 4 and 6 are filled with fluid, and there is no flow of fluid from section 1 to section 2, equal pressures are exerted on opposite sides of the movable wall 5 and the meter does not provide any indication. However, when fluid begins to flow from inlet 1 to outlet 2, the amount of force exerted on the left face of wall 5 exceeds that exerted on the right face of this wall by the amount of the reaction force applied to wall 5 by the curved wall portion 5a, and the wall 5 tends to move to the right. The amount of movement will depend upon the amount of reaction force and upon the resilient restraining force provided by the bellows sections 4 and 6 and by any other restraining means acting on wall 5. The amount of flow may be indicated by providing a suitable indicator for indicating the movement of the wall 5. Any suitable means may be employed for this purpose, preferably an arrangement for multiplying or amplifying the amount of travel of the plate 5. One suitable arrangement is indicated diagrammatically in Figure 1 in which a pinion 8 is rotated by means of a rack 9 connected to move with the plate 5, the pinion 8 being provided with an indicator arm which moves over a graduated scale 11 which may be calibrated in any suitable terms of flow.

In the arrangement shown in Figure 2, the intermediate conduit section has a different construction from that shown in Figure 1, and a different type of indicator is employed.

In Figure 2 the direction of flow of the fluid is reversed by means of a U-shaped section 12 of tubular conduit which preferably has a diameter equal to the diameter of the inlet and outlet conduit sections 1 and 2. One end of conduit section 12 is connected in fluid-tight relation with inlet section 1 by a cylindrical bellows 13, and the other end of section 12 has a similar connection with outlet section 2 through bellows 14. Thus, the entire intermediate conduit section 12 may move with respect to conduit sections 1 and 2 by reason of the flexible connections provided through the bellows elements 13 and 14. For the purpose of preventing movement of the curved section 12 under the static pressure of the fluid, a fluid-pressure motor, including a third bellows element 15, is interposed between the outer curved portion of the section 12 and the wall 3b of the casing or frame 3, the bellows 15 being closed at one end by plate 15a attached to the curved conduit section 12, and being closed at the other end by a fluid-tight joint to the wall 3b. Static fluid pressure is maintained in bellows 15 by the branch pipe connection 7 from the inlet conduit section 1.

In Figure 2, the indicating device is one which responds essentially to pressure and does not require any appreciable movement of the curved conduit section 12. In this arrangement, a strain-sensitive electrical resistance element 16 is connected between the wall 3a of frame 3 and the movable conduit section 12 so that the element 16 will be subjected to a strain whenever the curved section 12 tends to move away from the wall 3a under the reaction force produced by flow of fluid through the conduit. A suitable form of strain-sensitive element for use at 16 is shown in U. S. Patent to Simmons 2,292,549. Any strain applied to the element 16 causes this element to change in resistance value, and this change may be utilized to produce a suitable indication by means of an electric meter 17 connected in series with the element 16 in a circuit including a suitable source of electric current 18. The element 16, 17 and 18 constitute a "strain gage" which is well known in the field of force measurement. The meter 17 may be calibrated in any convenient terms to indicate the rate of flow of fluid through the conduit.

It will be noted that in each form of meter described above, the static fluid pressure on the movable member is counterbalanced by a fluid motor of the bellows type (see bellows 6 and bellows 15) having one end connected to the movable member and the other end fixed, and fluid is applied to the motor by a connection from the inlet conduit section through the fixed end of the motor.

I claim:

1. A flow meter comprising an inlet conduit section, an outlet conduit section arranged so that the direction of flow of fluid therein is at an angle to the direction of flow of fluid in said inlet section, a movable intermediate conduit section coupling said inlet and outlet sections and arranged to deflect fluid from said inlet conduit section into said outlet conduit section, said movable conduit section being movable under both the static pressure of said fluid and the reaction force caused by the change in direction of flow of said fluid, means resiliently opposing movement of said movable conduit section, means for counterbalancing the static fluid pressure acting on said movable conduit section comprising a bellows-type fluid motor connected to said movable conduit section to oppose movement thereof under the static pressure of said fluid, and a fluid supply conduit extending from said inlet conduit and connected to supply fluid to said motor at the same static pressure as the fluid in said inlet conduit, and indicator means controlled by said movable conduit section in response to the reaction force exerted thereon for indicating the rate of flow of fluid through said conduit sections.

2. A flow meter according to claim 1 wherein said indicator means comprises a movable indicator element, and a motion amplifying means connecting said movable conduit section to said movable indicator element.

3. A flow meter according to claim 1 wherein said indicator means comprises a strain gauge connected between a fixed part of said meter and said movable deflection member to be stressed according to the reaction force applied to said deflection member.

4. A flow meter according to claim 1 wherein said intermediate section comprises a tubular bellows having rigid end walls, one end wall being fixed and the other movable, said inlet and outlet conduit sections communicating with the interior of said bellows through the fixed end wall, and a deflection member comprising a curved wall portion rigidly secured to said movable end wall of said bellows and serving to deflect fluid from said inlet section into said outlet section.

5. A flow meter according to claim 1 and wherein said intermediate conduit section comprises a U-shaped section of tubular conduit, a cylindrical bellows connecting said inlet conduit section to one end of said U-shaped section, and a second cylindrical bellows connecting the other end of said U-shaped section to the outlet conduit section.

References Cited in the file of this patent

UNITED STATES PATENTS

| | | |
|---|---|---|
| 1,401,299 | Wohlenberg | Dec. 27, 1921 |
| 1,967,017 | Bohner | July 17, 1934 |
| 2,538,785 | Karig | Jan. 23, 1951 |
| 2,605,638 | Pearson | Aug. 5, 1952 |